United States Patent
Westerhoff

(12) 
(10) Patent No.: US 11,755,860 B2
(45) Date of Patent: Sep. 12, 2023

(54) PRINTER FOR PRINTING ON HISTOLOGY-LABORATORY CONSUMABLE ARTICLES

(71) Applicant: LEICA BIOSYSTEMS NUSSLOCH GMBH, Nussloch (DE)

(72) Inventor: Karl-Heinz Westerhoff, Eppingen (DE)

(73) Assignee: Leica Biosystems Nussloch GmbH, Nussloch (DE)

( * ) Notice: Subject to any disclaimer, the term of this patent is extended or adjusted under 35 U.S.C. 154(b) by 0 days.

(21) Appl. No.: 17/627,482

(22) PCT Filed: Jul. 6, 2020

(86) PCT No.: PCT/EP2020/068976
§ 371 (c)(1),
(2) Date: Jan. 14, 2022

(87) PCT Pub. No.: WO2021/008919
PCT Pub. Date: Jan. 21, 2021

(65) Prior Publication Data
US 2022/0269912 A1    Aug. 25, 2022

(30) Foreign Application Priority Data

Jul. 18, 2019    (LU) ........................................ 101311

(51) Int. Cl.
*G06K 15/02*    (2006.01)
*G06K 15/00*    (2006.01)
(52) U.S. Cl.
CPC ......... *G06K 15/024* (2013.01); *G06K 15/002* (2013.01); *G06K 15/1822* (2013.01)

(58) Field of Classification Search
None
See application file for complete search history.

(56) References Cited

U.S. PATENT DOCUMENTS

2009/0223390 A1    9/2009   Schlinkmann et al.
2015/0138295 A1    5/2015   Lindner et al.
(Continued)

FOREIGN PATENT DOCUMENTS

DE    202004006265    6/2004
EP         1245395    10/2002

OTHER PUBLICATIONS

WIPO, International Search Report for International Application No. PCT/EP2020/068976, dated Nov. 4, 2020.

*Primary Examiner* — Lennin R RodriguezGonzalez
(74) *Attorney, Agent, or Firm* — Hodgson Russ LLP

(57) ABSTRACT

A printer for printing on histology-laboratory consumable articles (16) includes an optical reading device (13), which reads an image pattern of a histology-laboratory consumable article (16) to be printed on by means of the printing device (4), generates analog or digital image-pattern image signals with regard to the read image pattern and transfers the image-pattern image signals to a control device (8) of the printer, and/or which reads an overprint (18) printed onto a histology-laboratory consumable article (16) by the printing device (4), generates analog or digital overprint image signals with regard to the read overprint (18) and transfers the overprint image signals to a control device (8) of the printer, which control device determines at least one quality parameter with regard to the overprint (18).

28 Claims, 8 Drawing Sheets

(56) References Cited

U.S. PATENT DOCUMENTS

Figure 1:
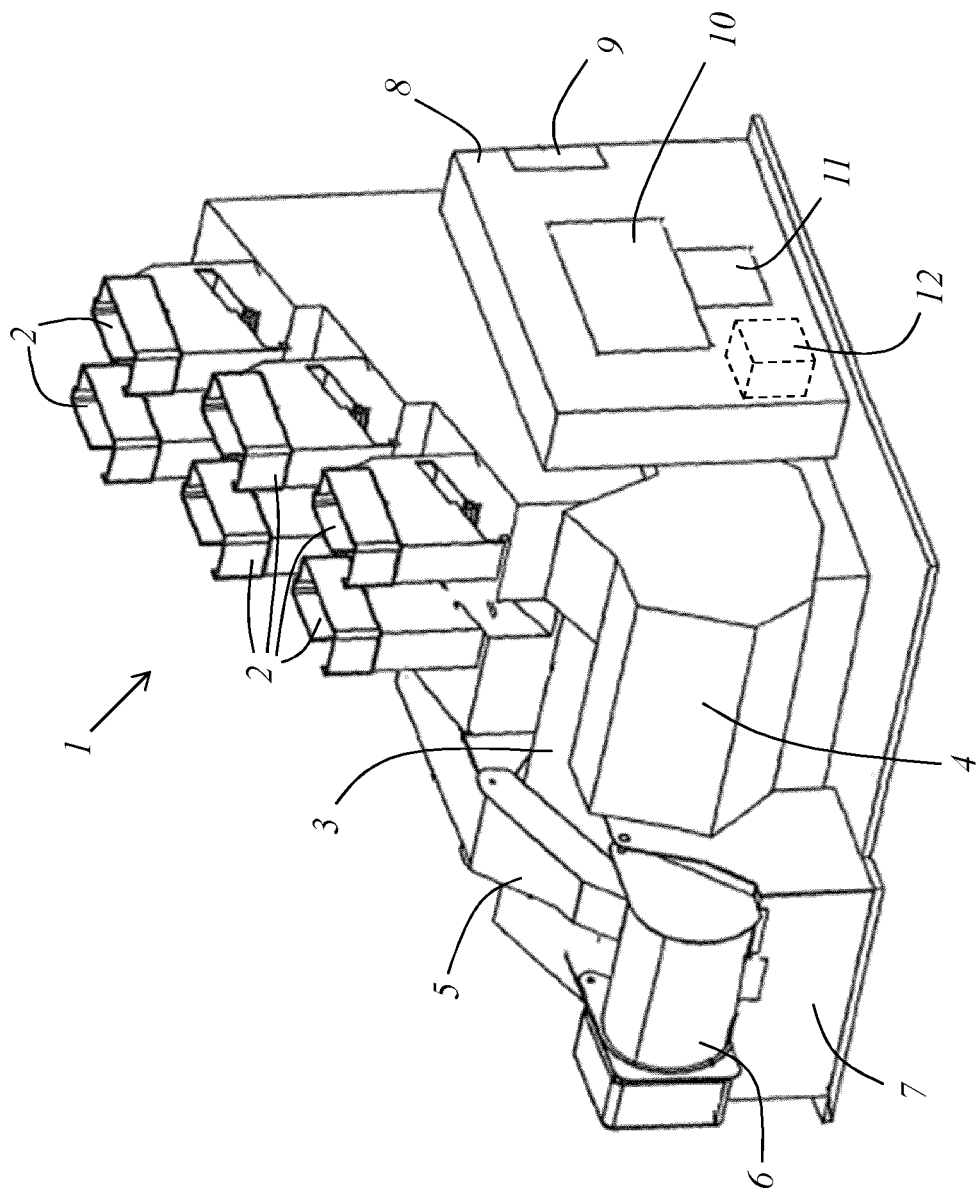

2016/0185132 A1\* 6/2016 Hughes .................... B41J 3/407
　　　　　　　　　　　　　　　　　　　　347/218
2019/0105021 A1　　4/2019 Von Bueren et al.
2019/0286401 A1\* 9/2019 Yasuda ................. G06F 3/1275

\* cited by examiner

PRINTER FOR PRINTING ON HISTOLOGY-LABORATORY CONSUMABLE ARTICLES

CROSS-REFERENCE TO RELATED APPLICATIONS

The present application is the U.S. national phase of International Application No. PCT/EP2020/068976 filed Jul. 6, 2020, which claims priority to Luxembourg Application No. 101311 filed Jul. 18, 2019, the entire disclosures of which are incorporated herein by reference.

FIELD OF THE DISCLOSURE

The invention relates to a printer for printing on histology-laboratory consumable articles.

BACKGROUND OF THE DISCLOSURE

Histological samples taken from a patient pass through a multiplicity of treatment steps in various treatment stations in a histological laboratory before they can be examined, for example with a microscope.

The purpose of the treatment of a histological sample is usually to put it in a state which allows slicing into thin layers with a microtome. This treatment is carried out at a plurality of processing stations. Sliceability may, for example, be made possible by introducing (infiltrating) a mechanically stabilizing medium into the tissue in a plurality of successive processing steps. For this purpose, the samples usually pass through a multiplicity of processing stations. For example, processing stations in the form of cutting stations, fixing stations, dehydration stations, cleaning stations, infiltration stations, embedding stations or microtomes (slicing stations) in a wide variety of embodiments are known. The fixing, dehydration, cleaning and infiltration may, for example, be carried out successively in a retort of a single item of equipment.

In a cutting station, the tissue, taken for example from a patient, is sliced into individual samples. The samples are usually placed in cassettes and transported to a fixing station. Fixing of the samples is necessary because the oxygen supply of the cells is stopped after the tissue is taken from the patient, which leads to cell death. Swelling of the cells may initially be observed, and protein denaturation as well as autolysis with subsequent bacterial digestion furthermore take place. In order to counteract this damage, the samples that have been taken are fixed in a fixing station with a fixative, for example formaldehyde.

After the treatment in the fixing station, dehydration of the samples is carried out in a dehydration station. Dehydration of the samples is necessary in order to permit the subsequent process of infiltration and embedding. Since the fixative, in particular formaldehyde, is usually an aqueous medium, while the infiltration or embedding agent to be used, in particular paraffin, is usually a medium that is immiscible with water, dehydration of the samples must be carried out before the further treatment of the samples in the dehydration station. The dehydration of the samples is carried out with the aid of a dehydrating agent, for example ethanol.

Before the samples are transferred to the infiltration station, they are furthermore cleaned. Cleaning is necessary since the alcohol in the tissue of the sample is immiscible with paraffin. The alcohol must therefore be removed from the tissue before the infiltration and replaced with a reagent, such as xylene, which is miscible with paraffin. After treatment of the sample in the cleaning station, it is brought to an infiltration station. In the infiltration station, an infiltration agent, which usually corresponds to the embedding agent subsequently used, is introduced into cavities of the sample until they are saturated. By the addition of the infiltration agent, the samples can be mechanically stabilized.

After the treatment of the sample in the infiltration station, it is processed in the embedding station. In the embedding station, embedding of the histological sample in an embedding agent, for example paraffin or wax, is carried out. In practice, the term "embedding" is used twofold. On the one hand, the term is used as a synonym for "infiltration", which is carried out in the aforementioned infiltration station, and on the other hand the term is also used for the "blocking" which is carried out in the embedding station.

For the embedding, the samples are removed from the cassette and placed together with the cassette in so-called molds, which are filled with the embedding agent. Cooling is subsequently carried out so that the embedding agent can set. For the cooling, the molds are usually placed on a cooling plate of the embedding station. As a result, an embedding block in which the sample is fixed in position on the cassette is obtained. After setting of the embedding agent, the cassette may be clamped in a microtome and the sample may be sliced into individual thin sample sections with the microtome, which can be placed on a slide and in a next step dyed and examined with a microscope.

In the process sequence, it is necessary in particular to ensure that the samples, or the sample sections, can at all times be assigned to the patient. To this end, special printers with which the cassettes in which the samples are intended to be fitted, and/or the slides on which the sample sections are placed, and/or the histology-laboratory consumable article labels, in particular adhesive labels, can be printed on in particular with patient-relevant data are used in histological laboratories. In this case, it is very important for the impression to be readable sufficiently accurately and sufficiently durably.

EP 1 245 395 A2 describes a method and an apparatus for printing on plastic cassettes fir histological preparations and/or slides for microscopic thin sections. The apparatus comprises a computer device for controlling the printing device. The printing device contains an inkjet printer for printing on the cassettes and/or the slides. The ink is predried by means of a warm-air dryer and fully dried by means of a flash device.

A system for identifying a tag on a tissue cassette in an arrangement of a plurality of tissue cassettes is known from US 2019/0105021 A1. The system comprises a sensor which automatically detects a tag on an individual tissue cassette or an image of the plurality of tissue cassettes in the arrangement. The system may contain a processor which can compare a tag with a tissue processing log.

DE 20 2004 006 265 U1 discloses a microtome which contains a slide printer. The microtome furthermore comprises a cassette code reading device.

US 2009/223390 A1 discloses an apparatus for printing information on glass surfaces, which comprises a slide printer. The apparatus furthermore comprises a 2D barcode scanner, past which the cassettes are guided. The information respectively read from the cassette is transferred to a control device. The control device then generates printing data for printing on a slide and transfers this data to the slide printer.

SUMMARY OF THE DISCLOSURE

The object of the present invention is to provide a printer for printing on histology-laboratory consumable articles, which increases the security of the process sequence during the processing of histological samples.

The object is achieved by a printer for printing on histology-laboratory consumable articles, which is characterized by an optical reading apparatus which a. reads an image pattern of a histology-laboratory consumable article (16) to be printed on by means of the printing device (4), generates analog or digital image-pattern image signals relating to the image pattern (18) that has been read, and transfers the image-pattern image signals to a control apparatus (8) of the printer, and/or which b. reads an impression printed on a histology-laboratory consumable article by the printing device, generates analog or digital impression image signals relating to the image pattern that has been read, and transfers the impression image signals to a control apparatus of the printer, which determines at least one quality parameter relating to the impression.

The invention has the very particular advantage that assignability of the histology-laboratory consumable article to a particular sample, or a particular patient, is ensured. It has been discovered that, for the assignability of the histology-laboratory consumable article to a particular sample, or a particular patient, it is particularly important to provide the histology-laboratory consumable article used correctly and with sufficient durability respectively with a specific impression.

According to the invention, to this extent the printer already establishes beforehand whether the respectively provided histology-laboratory consumable article can reliably be provided with a durably well-readable impression, and/or the printer itself checks the already applied impression after application.

According to the invention, it has been discovered inter alia that different cassettes, for example cassettes from different manufacturers, or cassettes which have been produced by different production processes, have very different properties in relation to the precise applicability and durability of an impression. In particular, it may for example be the case that the cassettes of a first manufacturer can be printed on particularly well and durably with a particular ink under certain printing parameters, while printing on cassettes from a different manufacturer under the same printing parameters and with the same ink leads to deficient results. In particular, it may for example disadvantageously happen that the impression is out of focus, blurring occurs or the impression is not sufficiently durable if a cassette insufficiently suitable for the adjusted printing parameters and/or the ink used is printed on. This may, for example, be attributable to the fact that the cassettes from different manufacturers or different product series are produced from different materials or material mixtures, in particular from different plastics.

In this case, a very particular difficulty is that the user cannot in general see directly from the cassettes used whether a sufficiently high-quality impression is possible with the printer used by them or the ink used by them. In particular, it may disadvantageously happen that insufficiently high-quality impressions are produced in large runs without the laboratory staff immediately noticing the deficiency of the impressions.

The same applies similarly when printing on other types of histology-laboratory consumable articles, for example slides, is involved.

The printer according to the invention has the very particular advantage that by means of the optical reading apparatus it is possible to establish beforehand whether the histology-laboratory consumable article to respectively be printed on can be printed on with sufficient quality. To this end, by means of the optical reading apparatus, the printer reads an image pattern, which may for example be a manufacturer logo or product logo, from the histology-laboratory consumable article respectively to be printed on and transfers corresponding analog or digital image-pattern image signals relating to the image pattern that has been read to a control apparatus. If, after an evaluation of the received image signals, the control apparatus establishes for example that the histology-laboratory consumable article is to be assigned to a particular manufacturer and/or a particular product series, in the next step it may establish whether and/or with which printing parameters an impression should be carried out. For this, it is advantageous for the relevant data relating to the histology-laboratory consumable articles of different manufacturers or different product series to be saved in a memory of the control apparatus.

It is in particular also possible for the control apparatus to establish that a histology-laboratory consumable article from which an image pattern has just been read cannot be printed on with sufficient quality; this, for example, because a histology-laboratory consumable article which is not compatible with the adjusted printing parameters and/or the ink used is being used. In this case, for example, the impression may be rejected or alternatively a warning may be output to the laboratory staff. In such a case, it may alternatively also be provided that an impression is carried out only after outputting a warning and after confirmation by the laboratory staff that printing is still desired. Correspondingly, as a precaution it is also possible to proceed in this way when a histology-laboratory consumable article to be printed on does not have an image pattern detectable by the optical reading apparatus or when a detected image pattern cannot be assigned to any manufacturer and/or any product series.

Very generally, it may be advantageous for the control apparatus to evaluate the received image-pattern image signals and, as a function of the evaluation result, to establish at least one processing step for the further processing of the histology-laboratory consumable article.

The establishment of the further processing steps is not necessarily final. For example, the control apparatus may initially establish as a processing step that an input by the user is required. The control apparatus may then establish further processing steps after the input is received and depending on the decision by the user.

The request for an input from a user may in particular be carried out when a histology-laboratory consumable article to be printed on, which is not compatible with the printing parameters of the printer, has been put into the printer, or when a histology-laboratory consumable article to be printed on does not have an image pattern that can be detected by the optical reading apparatus, or when a detected image pattern cannot be assigned to a manufacturer and/or a product series during the evaluation. The current printing parameters of the printer may, for example, relate to the ink or the toner or a drying temperature or a drying duration or a font size to be used or a font type to be used.

The printer may comprise a button or a keypad and/or another input apparatus, by means of which the user can make an input. As an alternative or in addition, it is also possible for the input to be entered via a computer, to which the printer is connected directly or via a network. The control apparatus evaluates the input and, as a function of the content of the input, may then delete an already established processing step and/or establish at least one further processing step for the further processing of the histology-laboratory consumable article.

For example, the control apparatus may delete the originally intended processing step of applying an impression when the user has input that printing on the histology-laboratory consumable article, in relation to which an input has been requested, should not take place.

In one very particularly advantageous embodiment, the control apparatus may stop the further processing of a histology-laboratory consumable article, in relation to which an input is expected, until the input arrives, and instead begin or continue the processing of at least one other histology-laboratory consumable article. This embodiment has the very particular advantage that the time available for printing on a multiplicity of histology-laboratory consumable articles is constantly utilized. In particular, it can advantageously be provided that a histology-laboratory consumable article for which an input is expected may temporarily be excluded and transferred to a standby position. As soon as the required input has taken place, the histology-laboratory consumable article is retrieved from the standby position and then, particularly as a function of the input made, either processed further and provided with a predetermined or individually predeterminable impression, or discarded without applying an impression.

It is possible for one of the processing steps to involve outputting a message to a user. For example, the printer according to the invention may be adapted in such a way that the control apparatus outputs the message that everything is in order and an impression as intended can be carried out when the control apparatus has recognized the histology-laboratory consumable article to be printed on and has established that a high-quality impression is possible. Similarly, it is also possible for a warning to be output when the control apparatus has recognized that a sufficiently high-quality impression is not possible or when the control apparatus has not been able to assign a manufacturer and/or a product series to the detected image pattern during the evaluation.

In particular, a working step established by the control apparatus may involve printing on the histology-laboratory consumable article, the image pattern of which has been read and evaluated, with a predetermined or individually predeterminable impression. For example, the control apparatus establishes this step when it has been able to assign the image pattern read from the histology-laboratory consumable article to a particular manufacturer and/or a particular product series, of which the control apparatus has the information that printing with the adjusted printing parameters is possible with a sufficiently high quality.

In particular, for this purpose assignment of different image patterns to the information as to whether or not a sufficiently high-quality impression is possible may be saved in a memory device of the control apparatus.

As an alternative or in addition, the assignment which is saved in a memory device of the control apparatus may also contain more detailed information, for example information about required printing parameters. The required printing parameters may for example relate to properties of the ink advantageously to be used or a drying temperature or a drying duration or information about a duration and/or temperature of warm-air predrying or about a temperature and duration of full drying in a flash device or about a font size to be used or a font type to be used.

In one particularly flexibly usable embodiment of the printer according to the invention, the control apparatus matches at least one printing parameter of the printer individually to the printing parameters determined as being required.

In particular, the printer may advantageously examine each histology-laboratory consumable article for image patterns by means of the optical reading apparatus, and in the event that an impression should be carried out, provide them with a predetermined or individually respectively predeterminable impression. For example, the printer may advantageously receive the information about the impression individually to be applied, which may in particular contain patient data, from a superordinate computer to which the printer is connected directly or via a network.

As already mentioned, it may also happen that one of the processing steps established by the control apparatus involves discarding the histology-laboratory consumable article without printing on it. This may in particular be done in combination with the output of a warning to the user, for example on a display of the printer, and/or on a connected computer.

In one particularly advantageous embodiment, the control apparatus keeps a log. In particular, whether it has been possible to read an image pattern and/or whether it has been possible to evaluate an image pattern that has been read and/or whether it has been possible to assign an image pattern that has been read to a manufacturer or a product series and/or whether an impression has been carried out, may advantageously be logged for each individual histology-laboratory consumable article introduced. The log may in particular contain the image pattern per se and/or data relating to the impression carried out. Furthermore, the log may contain information about the instant of the processing of the respective histology-laboratory consumable article and/or about an assigned patient and/or the batch number of the printing medium used and/or the batch number of the histology-laboratory consumable article used.

Preferably, the control apparatus saves the log data continuously in a memory and/or outputs the log data via an interface. As an alternative or in addition, it is also possible for the control apparatus to display, in particular continuously display, the log data on an output apparatus, for example a display of the printer.

In one variant, logging is exclusively carried out only in the cases recognized as problematic, for example because it has not been possible to read an image pattern or because it has been found after the evaluation that it has not been possible to carry out an impression with a sufficiently high quality.

In particular, one of the processing steps may involve saving the image signals of the image pattern that has been read and/or saving information determined by the control apparatus about the histology-laboratory consumable article. This may in particular be carried out in such a way that the corresponding data are stored in the log already mentioned above.

In one particularly advantageous embodiment, the control apparatus compares the image-pattern image signals received from the optical reading apparatus with the image signals of at least one reference image pattern. To this end, a memory apparatus in which image signals of at least one reference image pattern are saved or can be saved may be provided. The control apparatus may individually call up the reference image patterns from the memory apparatus and compare them with the image-pattern image signals received from the optical reading apparatus.

As already mentioned, the control apparatus may advantageously determine on the basis of the image-pattern image signals whether, and optionally how, in particular with which printing parameters, the respective histology-laboratory consumable article is to be printed on.

In one particularly flexible embodiment, the control apparatus determines on the basis of the image-pattern image signals where a printing field is located on the histology-laboratory consumable article. If it is established that an impression should be carried out, the control apparatus causes the printing to be carried out exactly in the printing field. In such an embodiment of the printer according to the invention, very different histology-laboratory consumable articles may be used particularly flexibly.

The optical reading apparatus may in particular be configured and arranged to read an image pattern configured as a barcode or as a QR code or as a logo or as text. There are no fundamental restrictions in relation to the type of image patterns that can be read.

In one very particularly advantageous embodiment, it is in particular not necessary for the image patterns always to be arranged at the same location on the histology-laboratory consumable article. Rather, in this embodiment the entire histology-laboratory consumable article is detected by means of the optical reading apparatus in order to establish where an image pattern that can be evaluated is located.

Preferably, the printer according to the invention comprises a compartment for a multiplicity of histology-laboratory consumable articles to be printed on, from which the transport apparatus individually takes the histology-laboratory consumable articles to be printed on and transports them further. In this case, the optical reading apparatus may in particular advantageously read the image pattern respectively during the transport to the printing device.

As already mentioned, the histology-laboratory consumable article may for example be a cassette for tissue samples or a slide, in particular for thin sections. To this extent, the printer may be specially configured as a cassette printer and/or as a slide printer.

The printer according to the invention may, in particular, be configured as an inkjet printer or as a laser printer.

As already mentioned, the optical reading apparatus may advantageously read an impression printed by the printing device on a histology-laboratory consumable article, generate analog or digital impression image signals relating to the impression that has been read and transfer the impression image signals to a control apparatus of the printer. In this way, after the application the printer may itself check the already applied impression as to whether the respective impression has been carried out properly.

This advantageously ensures that the reading of the impression by machine and/or by a person during the subsequent process steps in the processing of the sample can always be carried out reliably.

This inventive concept makes it possible to recognize whether the impression is carried out with a quality sufficient for a subsequent reading by a person and/or by a machine. If, for example, it is found that the impression is out of focus and/or blurred, a warning may for example be output. As an alternative or in addition, it is for example also possible to reject a histology-laboratory consumable article that has been printed on defectively, to repeat the printing of the desired impression on another histology-laboratory consumable article, and thus to replace the histology-laboratory consumable article having the defective impression with another histology-laboratory consumable article having an impression as intended.

The impression which the printer applies may be monochromatic or, as an alternative, also polychromatic.

In one particularly reliable embodiment, the control apparatus evaluates the impression image signals received from the optical reading apparatus. This may advantageously be carried out, for example, by comparing the received impression image signals with the analog or digital image signals of the associated target impression image pattern. In particular, the control apparatus may advantageously compare the impression image signals received from the optical reading apparatus with the image signals of the target impression image pattern by image analysis and/or by pattern recognition.

The printer may receive the analog or digital image signals of the target impression image pattern, which may contain in particular patient data in clear text or encoded form, for example from a superordinate computer to which the printer is connected directly or via a network.

Preferably, the control apparatus controls the printing device of the printer in such a way that an impression that is as close as possible to the respective target impression image pattern is printed onto the respective histology-laboratory consumable article.

In one very particularly advantageous embodiment, the control apparatus determines at least one quality parameter relating to the impression. The determination of at least one quality parameter may in particular be carried out by the above-mentioned comparison of the image data of the impression with the image data of the target impression image pattern and/or by an image analysis. The quality parameter may in particular relate to the sharpness of the impression and/or the contrast of the impression and/or the printing resolution of the impression and/or the accuracy of the color or colors of the impression and/or the constancy of the color or colors of the impression and/or the color gradient of the impression and or the location of the impression on the histology-laboratory consumable article. Quality parameters may in particular also relate to the presence of the impression on the histology-laboratory consumable article. If it is found that an impression has not been carried out at all, for example a warning may be output and/or a check, in particular an automatic check, of the printing device, in particular of the ink or toner filling level, may be carried out.

In a similar way as in relation to the evaluation of the image pattern, the control apparatus may establish as a function of the evaluation result at least one processing step for the further processing of the histology-laboratory consumable article inside the printer.

The establishment of at least one processing step, as already mentioned, is not necessarily final. For example, the control apparatus may initially establish as a processing step that an input by the user is required. After receiving the input and depending on the decision by the user, the control apparatus may then establish further processing steps.

The request for an input by a user may in particular be carried out when it has been established that an impression has not been carried out, or has not been carried out correctly. In this case, the user may for example inspect the histology-laboratory consumable article and either cause release or a printing repetition of the target impression image pattern on another histology-laboratory consumable article.

As already mentioned, the control apparatus may stop the further processing of a histology-laboratory consumable article, in relation to which an input is expected, until the input arrives, and instead begin or continue the processing of at least one other histology-laboratory consumable article. In particular, a histology-laboratory consumable article already provided with an impression, in relation to which an input is expected, may advantageously temporarily be excluded and transferred to a standby position. As soon as the required input has taken place, the histology-laboratory consumable article is retrieved from the standby position and then, particularly as a function of the input made, either processed further or discarded, preferably in favor of repeating the impression on a new histology-laboratory consumable article.

As already mentioned, it is possible for one of the processing steps to involve outputting a message to a user. For example, the printer according to the invention may be adapted in such a way that the control apparatus outputs the message that everything is in order when the control apparatus has established that a high-quality impression has been applied. Similarly, it is also possible for a warning to be output when the control apparatus has recognized that a sufficiently high-quality impression has not been carried out.

In one very particularly advantageous embodiment, the control apparatus establishes at least one printing parameter for the repetition of the printing of the target impression image pattern on another histology-laboratory consumable article as a function of the image signals of the impression that has been read and/or as a function of a quality parameter determined relating to the impression. In this embodiment, the new impression on another histology-laboratory consumable article is advantageously carried out with at least one modified printing parameter in order to avoid another defective impression. The control apparatus preferably changes the printing parameter (or a plurality of printing parameters) specifically in respect of the error established or the error type established in the defective impression previously carried out. The printing parameter may for example relate to the ink, in particular the type of ink, or the toner, in particular the type of toner, or a drying temperature or a drying duration or a font size to be used or a font type to be used. For example, it is possible for the control apparatus to select a different ink from a different ink reservoir of the printer and/or a different drying duration for a new impression.

In one particular embodiment, the control apparatus respectively saves the received impression image signals in a memory device. In particular, the control apparatus may advantageously save the received impression image signals respectively together with the image signals of the associated target impression image pattern. In this way, the impression may be compared with the target impression image pattern at a later time, in particular by machine or by a user.

The printer may, as already mentioned, comprise a transport apparatus which transports the histology-laboratory consumable articles.

In this case, the optical reading device may particularly advantageously read the image pattern respectively during the transport of a histology-laboratory consumable article to be printed on to the printing device. This has the particular advantage that the reading of the impression may be carried out in dead time so that the overall process sequence inside the printer is not slowed down.

In one particularly advantageous embodiment, the transport apparatus transports the histology-laboratory consumable article printed on by the printing device further to a removal device from which the histology-laboratory consumable article that has been printed on can be removed, in particular together with further histology-laboratory consumable articles that have been printed on. In this embodiment, the optical reading apparatus may particularly advantageously read the impression respectively during the transport of the histology-laboratory consumable article that has been printed on. This has the particular advantage that the reading of the impression may be carried out in dead time so that the overall process sequence inside the printer is not slowed down.

The printing device may in particular be configured to apply an impression configured as an image or as a barcode or as a QR code or as a logo or as text onto the histology-laboratory consumable article.

As already mentioned, the control apparatus may advantageously keep a log. In particular, whether it has been possible to evaluate an image pattern that has been read and/or whether an impression that has been read is error-free may advantageously be logged for each individual histology-laboratory consumable article introduced. The log may in particular contain the image data of the impression that has been read and/or the printing parameters relating to the impression carried out. Furthermore, the log may contain information about the instant of the processing of the respective histology-laboratory consumable article and/or about an assigned patient and/or the batch number of the printing medium used and/or the batch number of the histology-laboratory consumable article used.

Preferably, the control apparatus saves log data continuously in a memory and/or outputs log data via an interface. As an alternative or in addition, it is also possible for the control apparatus to display, in particular continuously display, the log data on an output apparatus, for example a display of the printer.

In one very particularly advantageous embodiment, the log data are transferred to a superordinate computer and saved and/or processed further there.

In particular—and according to an independent inventive concept—the superordinate computer may advantageously receive further log data of other printers and/or other laboratory equipment and save and/or further process them, in particular together with the log data of the printer. Very generally and according to the independent inventive concept, a histology laboratory system which contains a superordinate computer that receives, saves and/or further processes the log data of a printer according to the invention and/or further log data of other all will be laboratory equipment is particularly advantageous.

Preferably, the log data and the further log data, which relate to the same sample, are saved and/or processed further by the superordinate computer while being assigned to one another and together. In particular, this makes it possible for a superordinate log, which contains the log data transferred from the printer and the further log data of other printers and/or laboratory equipment, to be compiled by the superordinate computer in particular in a sample-specific manner. The superordinate log may preferably contain data relating to all process steps during the processing of a sample in a histological laboratory. To this extent, the superordinate log may in particular contain log data and further log data, which contain the processing of a sample from the cutting station to the diagnosis by means of a microscope. It is, however, also possible for the superordinate log to contain log data and further log data of a subsection of such a processing sequence of a sample.

In one variant, logging is exclusively carried out only in the cases recognized as problematic, in particular when the quality of the impression is insufficient.

In particular, one of the processing steps may involve saving the image signals of the impression that has been read and/or saving information determined by the control apparatus about the histology-laboratory consumable article.

This may in particular be carried out in such a way that the corresponding data are stored in the log already mentioned above.

The histology-laboratory consumable article to be printed on by means of the printer according to the invention may in particular be a cassette in which at least one histological sample is fitted or is intended to be fitted, or a slide on which a sample section is placed or is intended to be placed, or a label, and in particular an adhesive label, of a histology-laboratory consumable article. Preferably, the printer is configured and intended to provide histology-laboratory consumable articles of at least one of the aforementioned types of histology-laboratory consumable articles with an impression. To this extent, the printer may especially be configured as a cassette printer and/or as a slide printer and/or as a label printer.

The printer according to the invention may in particular be configured as an inkjet printer or as a laser printer.

According to an independent inventive concept, a printer having a printing device for printing on histology-laboratory consumable articles, characterized by an optical reading apparatus which reads an image pattern of a histology-laboratory consumable article to be printed on by means of the printing device, generates analog or digital image-pattern image signals relating to the image pattern that has been read, and transfers the image-pattern image signals to a control apparatus (8) of the printer, and/or which reads an impression printed on a histology-laboratory consumable article by the printing device, generates analog or digital impression image signals relating to the image pattern that has been read, and transfers the impression image signals to a control apparatus of the printer, is particularly advantageous. The printer may have one or more of the additional features stated above and/or mentioned in the claims.

BRIEF DESCRIPTION OF THE DRAWING VIEWS

The subject-matter of the invention is represented by way of example and schematically in the drawing and will be described below with the aid of the figures, elements which are the same or have the same effect also usually being provided with the same references in the various exemplary embodiments.

Figure 2:
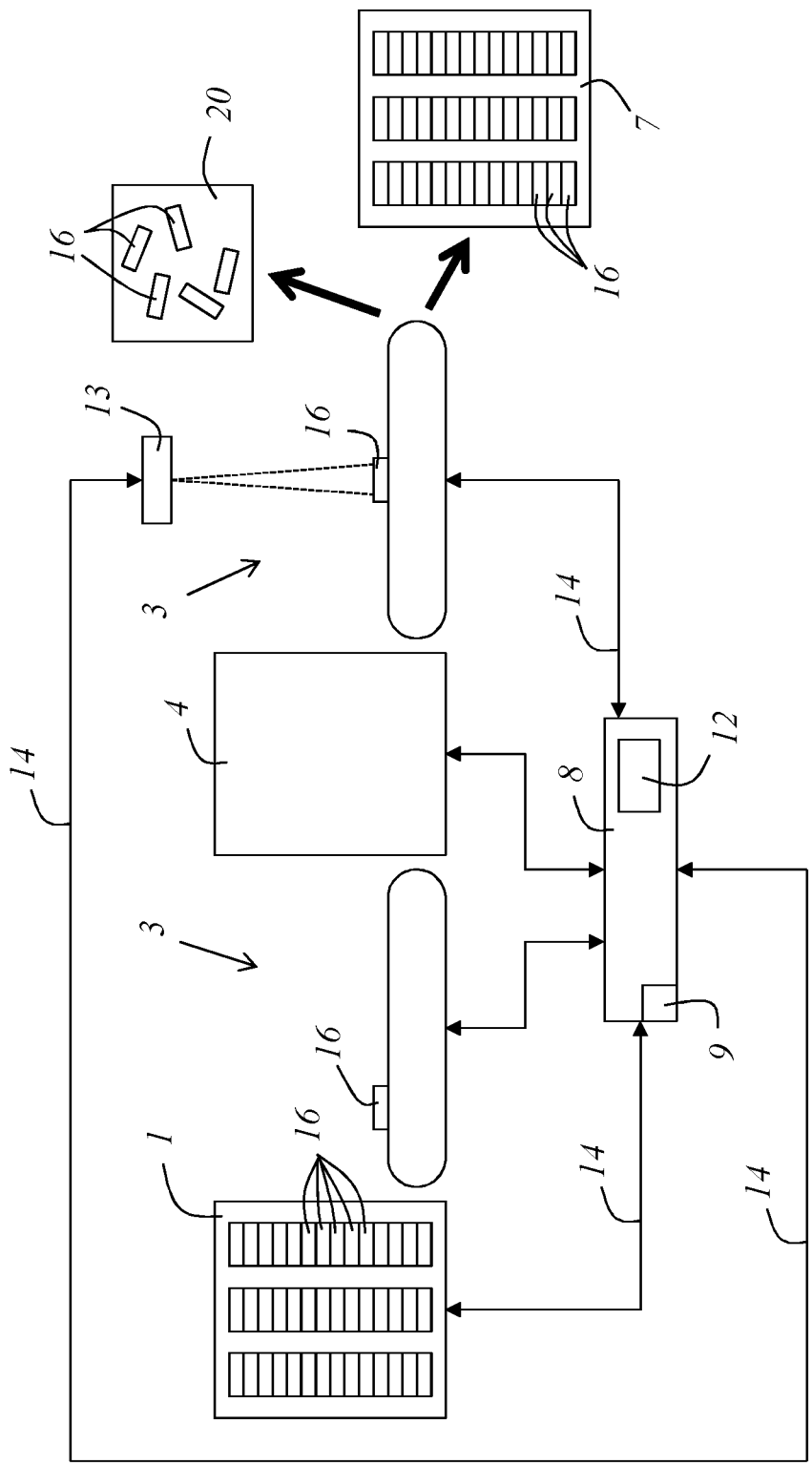
Figure 3:
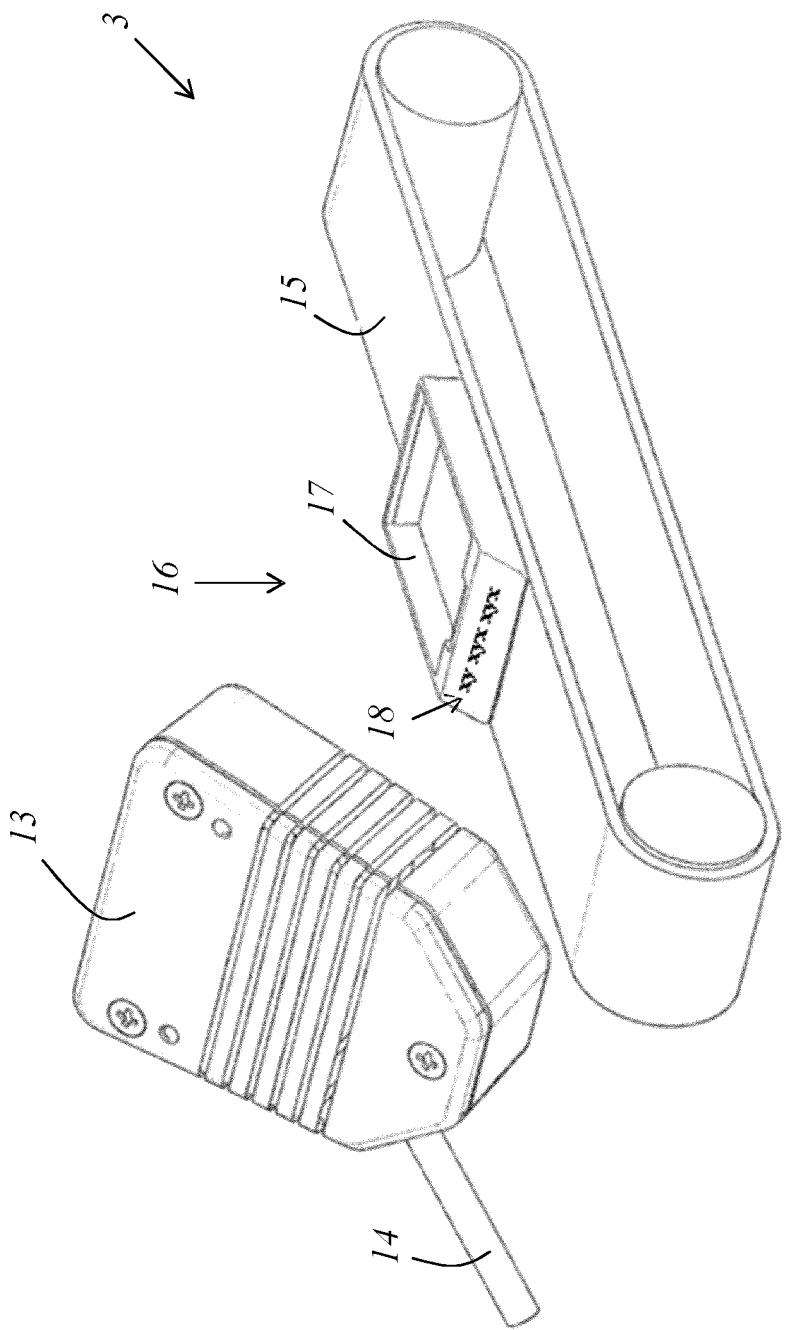
Figure 4:
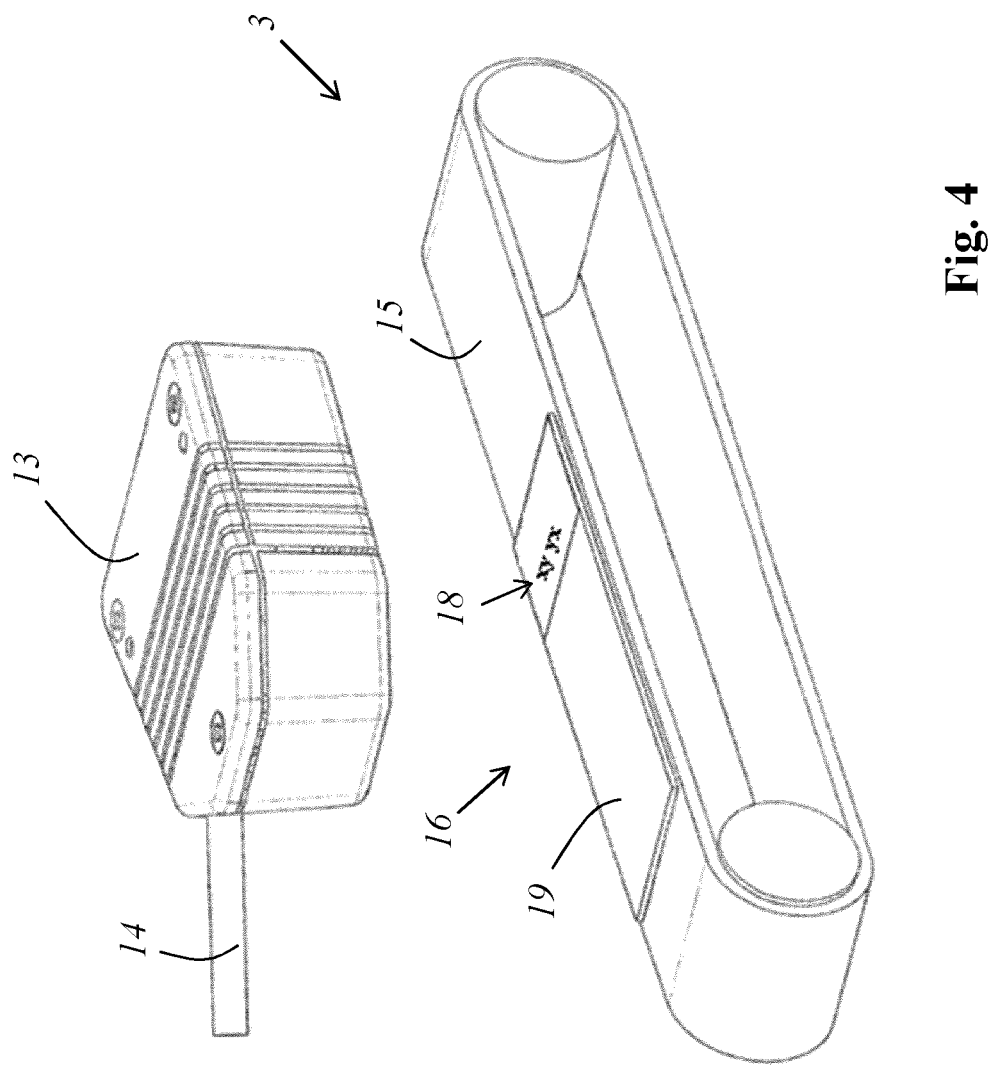
Figure 5:
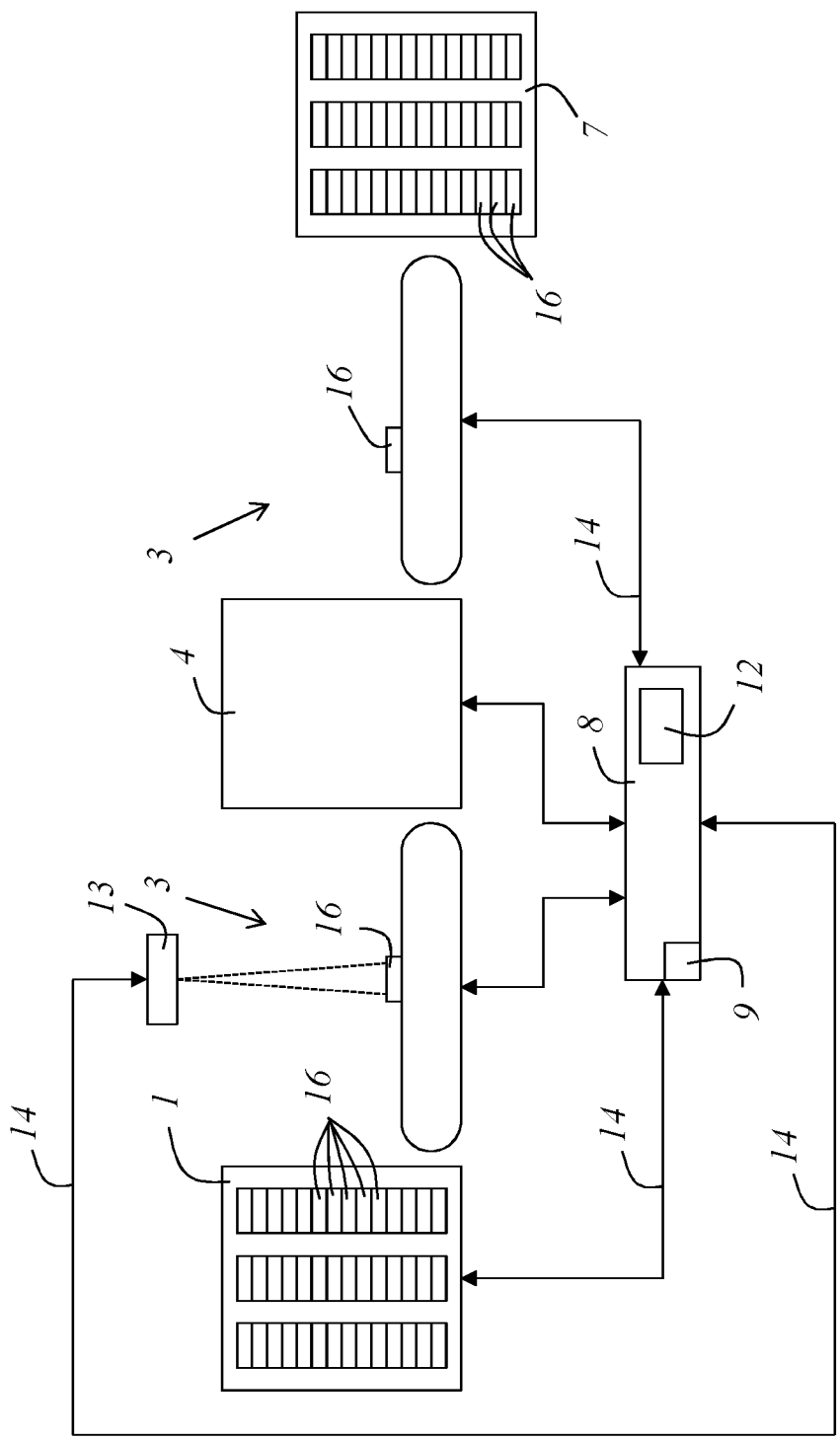
Figure 6:
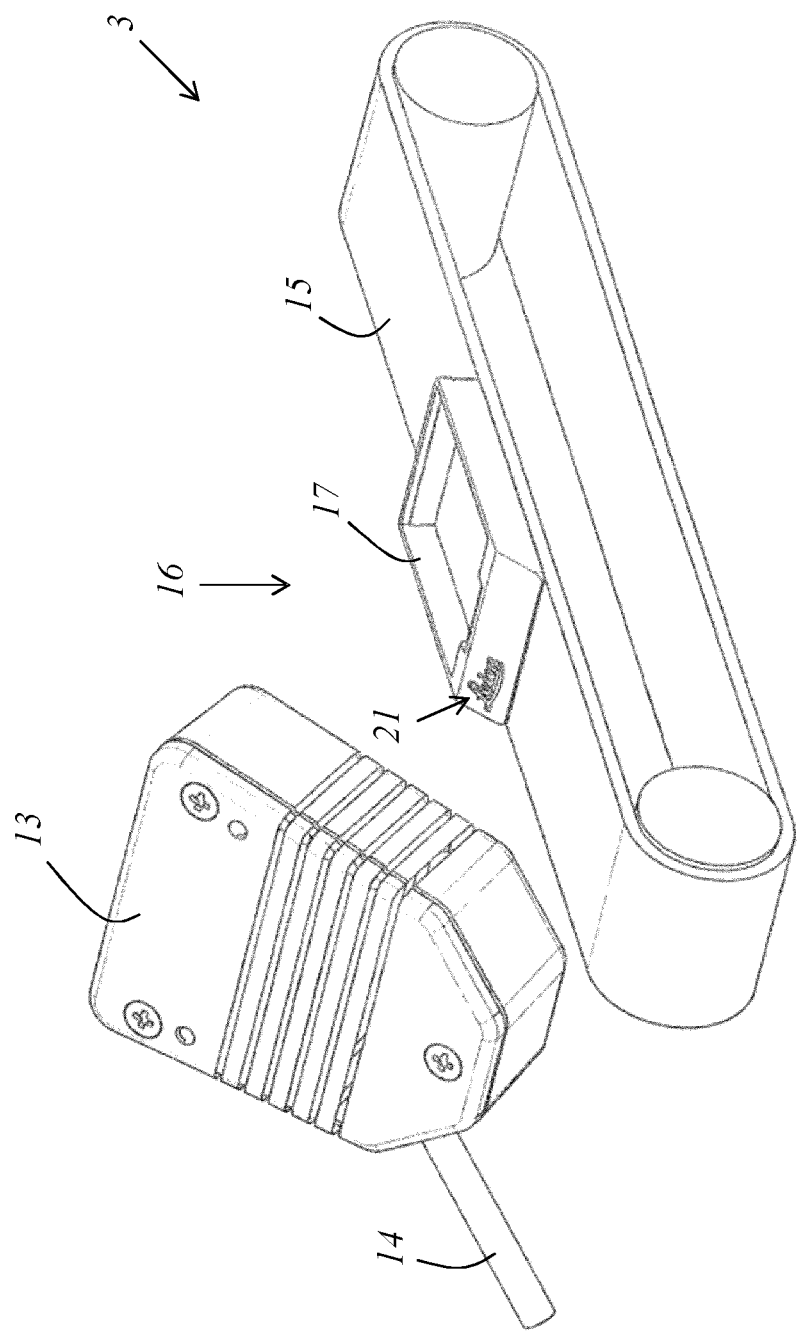
Figure 7:
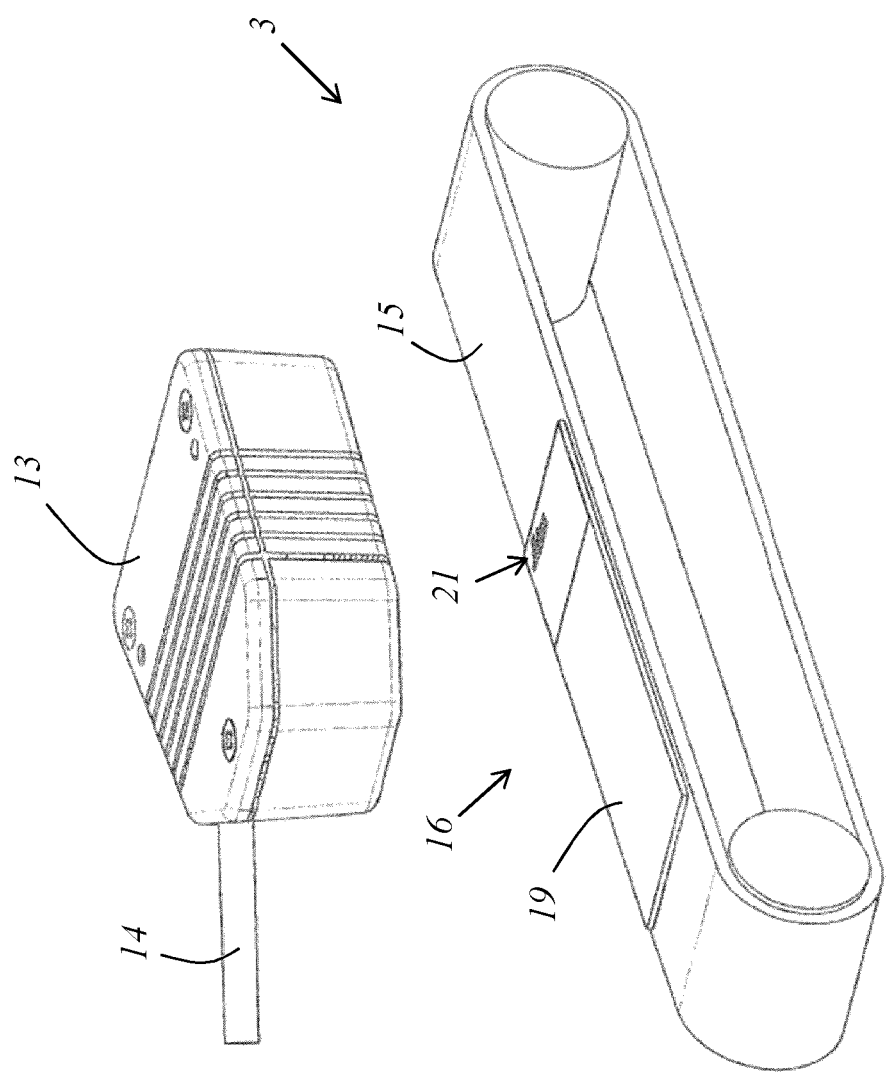
Figure 8:
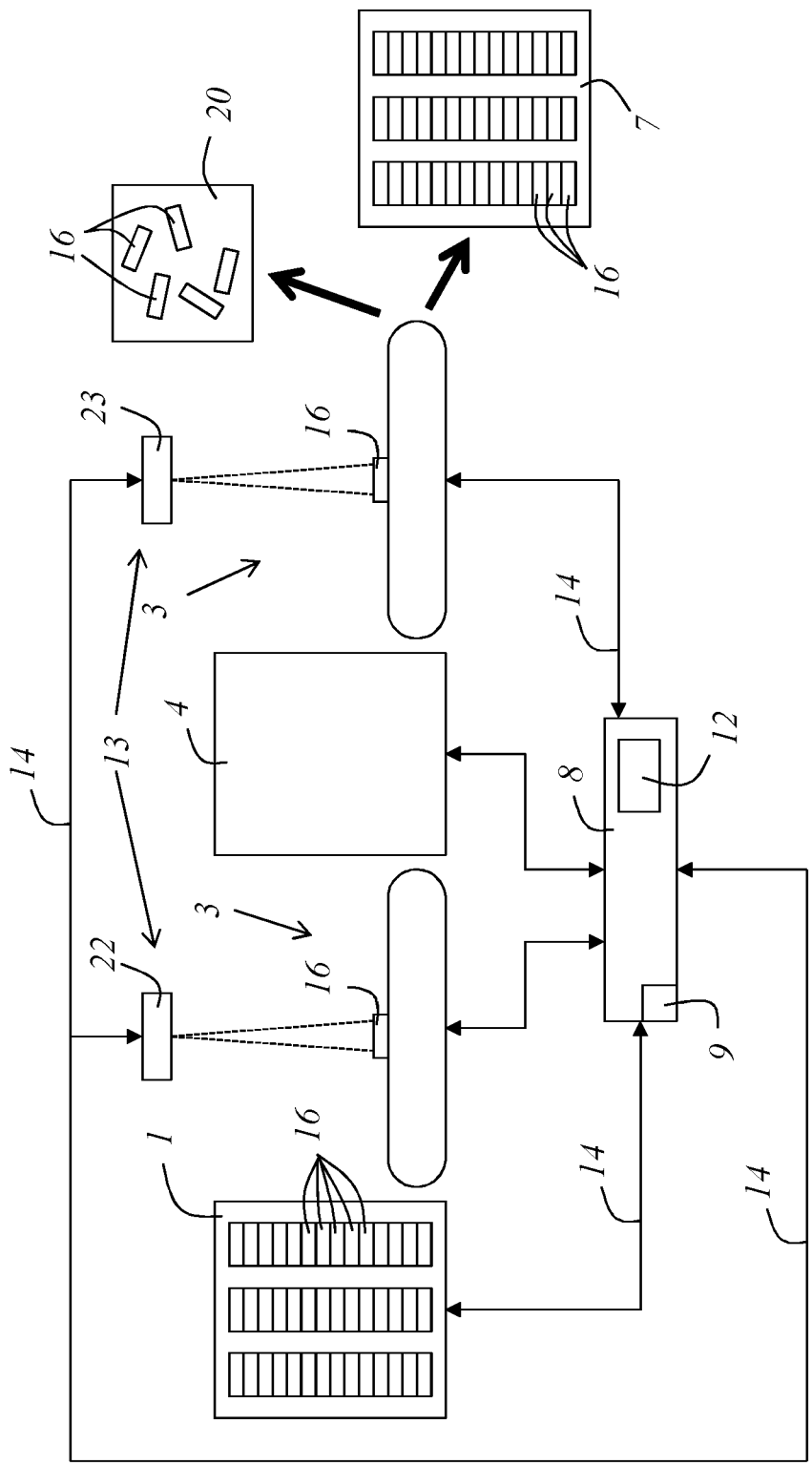

FIG. 1 shows a first exemplary embodiment of a printer according to the invention, FIG. 2 shows a second exemplary embodiment of a printer according to the invention, FIG. 3 shows a detail of a third exemplary embodiment of a printer according to the invention, FIG. 4 shows a detail of a fourth exemplary embodiment of a printer according to the invention, FIG. 5 shows a fifth exemplary embodiment of a printer according to the invention, FIG. 6 shows a detail of a sixth exemplary embodiment of a printer according to the invention, FIG. 7 shows a detail of a seventh exemplary embodiment of a printer according to the invention, and FIG. 8 shows an eighth exemplary embodiment of a printer according to the invention.

DETAILED DESCRIPTION

FIG. 1 shows a first exemplary embodiment of a printer according to the invention, which comprises a material supply 1. The material supply 1 contains a plurality of stack magazines 2 for histology-laboratory consumable articles 16 (not visible in this figure) to be printed on, for example cassettes 17 or slides 19 or labels. The material supply 1 is assigned a transport apparatus 3 which respectively transports a histology-laboratory consumable article 16 in succession from the material supply 1 to a printing device 4. The printing device 4 may, for example, contain an inkjet printer. The histology-laboratory consumable articles 16 that have been printed on are conveyed by the transport apparatus 3 to a warm-air drying apparatus 5 and predried there. The histology-laboratory consumable articles 16 are then conveyed to a flash device 6 which ensures full drying of the ink by supplying heat with infrared radiation and/or UV radiation. The histology-laboratory consumable articles 16 processed in this way are subsequently forwarded to a removal device 7.

The printer comprises an optical reading apparatus 13 (not visible in FIG. 1), which reads an impression 18 printed by the printing device 4 onto a histology-laboratory consumable article 16 and generates analog or digital impression image signals relating to the impression 18 that has been read. The impression image signals are transferred to a control apparatus 8 of the printer.

The control apparatus 8 comprises an interface 9 for connecting the printer to a computer network or for direct connection to a computer.

The control apparatus 8 furthermore comprises a display 10, by means of which messages can be output to a user. In particular, the display 10 may also be used to request inputs by a user, which the user may input via an input apparatus 11, which may for example be a keypad. The display 10 may, for example, also be used to continuously display information about the impressions 18 that have been read by means of the optical reading apparatus and/or the evaluation results relating to the impressions 18 that have been read.

The control apparatus 8 contains a memory apparatus 12 in which the control apparatus respectively saves the received impression image signals respectively together with the image signals of the associated target impression image pattern. In particular, a log, which may be forwarded via the interface 9 to a connected computer and/or which may be represented on the display 10, may advantageously be saved in the memory apparatus 12.

FIG. 2 schematically shows a second exemplary embodiment of a printer according to the invention.

The printer comprises a material supply 1, in which histology-laboratory consumable articles 16 to be printed on, for example cassettes 17 or slides 19, can be stored.

The printer furthermore comprises a transport apparatus 3, which respectively transports a histology-laboratory consumable article 16 in succession from the material supply 1 to a printing device 4. The transport apparatus 3 furthermore transports the histology-laboratory consumable articles 16 that have been printed on by the printing device 4 to a removal device 7, from which the histology-laboratory consumable articles 16 that have been printed on can then be removed.

The printer furthermore comprises an optical reading apparatus 13, which reads an impression 18 printed by the printing device 4 onto a histology-laboratory consumable article 16 while it is being transported away from the printing device 4. The optical reading apparatus 13 generates analog or digital impression image signals relating to the impression 18 that has been read and transfers the impression image signals to the control apparatus 8. The control apparatus 8 comprises an interface 9 for connecting the printer to a computer network or for direct connection to a computer.

The control apparatus 8 is connected by means of data cables 14 to the material supply 1, the transport apparatus 3 and the printing device 4, in order to receive data and/or output control instructions.

The control apparatus 8 evaluates the impression image signals received from the optical reading apparatus 13. This is done by comparing the received impression image signals with the analog or digital image signals of the associated target impression image pattern. The printer receives the analog or digital image signals of the target impression image pattern, which can contain in particular patient data in clear text or in coded form, from a superordinate computer (not represented in this figure) to which the printer is connected by means of the interface 9. In particular the control apparatus 8 may advantageously control the printing device 4 correspondingly in order respectively to print an impression 18 as similar as possible to the target impression image pattern onto the histology-laboratory consumable article.

If the evaluation reveals that the impression 18 applied onto the respective histology-laboratory consumable article 16 is error-free, the control apparatus 8 controls the transport apparatus 3 in such a way that the histology-laboratory consumable article 16 is transported to the removal device 7.

If the evaluation reveals that the impression 18 applied onto the respective histology-laboratory consumable article 16 is not error-free, the histology-laboratory consumable article 16 is excluded. In this case, the control apparatus 8 controls the transport apparatus 3 in such a way that the histology-laboratory consumable article 16 is transported to a further removal device 20, from which the user can remove the histology-laboratory consumable article 16 that has been incorrectly printed on, in particular for subsequent disposal.

FIG. 3 shows a detail of a third exemplary embodiment of a printer according to the invention, which comprises a transport device 3. The transport device 3 transports further the histology-laboratory consumable articles 16 which have been provided with an impression in a printing device 4 (not represented in this figure). The transport device 3 comprises a conveyor belt 15 on which the histology-laboratory consumable articles 16, namely cassettes 17, are transported.

The printer contains an optical reading device 13, which may for example be configured as a digital camera. The optical reading device 13 is connected via a data cable 14 to a control apparatus 8 (not represented in this figure). The optical reading device 13 reads the impression 18 of each histology-laboratory consumable article 16 passing it and forwards analog or digital impression image signals relating to the impression 18 that has been read via the data cable 14 to the control apparatus 8.

FIG. 4 shows a detail of a fourth exemplary embodiment of a printer according to the invention, which comprises a transport device 3. The transport device 3 transports further the histology-laboratory consumable articles 16 which have been provided with an impression 18 in a printing device 4 (not represented in this figure). The transport device 3 comprises a conveyor belt 15 on which the histology-laboratory consumable articles 16, slides 19, are transported.

The printer contains an optical reading device 13, which may for example be configured as a digital camera. The optical reading device 13 is connected via a data cable 14 to a control apparatus 8 (not represented in this figure). The optical reading device 13 reads the impression 18 of each histology-laboratory consumable article 16 passing it and forwards analog or digital impression image signals relating to the impression 18 that has been read via the data cable 14 to the control apparatus 8.

FIG. 5 schematically shows a fifth exemplary embodiment of a printer according to the invention.

The printer comprises a material supply 1, in which histology-laboratory consumable articles 16 to be printed on, for example cassettes 17 or slides 19, can be stored.

The printer furthermore comprises a transport apparatus 3, which respectively transports a histology-laboratory consumable article 16 in succession from the material supply 1 to a printing device 4. The transport apparatus 3 furthermore transports the histology-laboratory consumable articles 16 that have been printed on by the printing device 4 to a removal device 7, from which the histology-laboratory consumable articles 16 that have been printed on can then be removed.

The printer furthermore comprises an optical reading apparatus 13, which reads an image pattern 21 of a histology-laboratory consumable article 16 to be printed on, generates analog or digital image-pattern image signals relating to the image pattern 21 that has been read and transfers the image-pattern image signals to a control apparatus 8 of the printer.

The control apparatus 8 comprises an interface 9 for connecting the printer to a computer network, a superordinate computer or for direct connection to a computer.

The control apparatus 8 is connected by means of data cables 14 to the material supply 1, the transport apparatus 3 and the printing device 4, in order to receive data and/or output control instructions.

The control apparatus 8 evaluates the image-pattern image signals received from the optical reading apparatus 13 and establishes at least one processing step for the further processing of the histology-laboratory consumable articles 16 as a function of the evaluation result. During the evaluation, the control apparatus 8 compares the image-pattern image signals received from the optical reading device 13 with the image signals of at least one reference image pattern.

If the control apparatus 8 has recognized the histology-laboratory consumable article 16 to be printed on and has established that a high-quality impression is possible, the control apparatus 8 outputs the message that everything is in order. At the same time, the control apparatus 8 establishes as a further processing step that an impression as intended should be carried out.

If the evaluation reveals that a sufficiently high-quality impression is not possible, or if the control apparatus 8 has not been able to assign a manufacturer and/or a product series to the detected image pattern 21 during the evaluation, a warning is output. In particular, in this case an impression may not be carried out until after confirmation by the laboratory staff that printing is still desired.

FIG. 6 shows a detail of a sixth exemplary embodiment of a printer according to the invention, which has further a transport device 3 for transporting histology-laboratory consumable articles 16 coming from a material supply 1 (not represented in this figure).

The printer contains an optical reading device 13, which may for example be configured as a digital camera. The optical reading device 13 is connected via a data cable 14 to a control apparatus 8 (not represented in this figure). The optical reading device 13 forwards analog or digital image-pattern image signals of the image pattern 21 that has respectively been read via the data cable 14 to the control apparatus 8.

The transport device 3 comprises a conveyor belt 15 on which histology-laboratory consumable articles 16, namely cassettes 17, are transported. The optical reading device 13 reads an image pattern 21 of each histology-laboratory consumable article 16 passing it and forwards image signals relating to the image pattern 21 that has been read to the control apparatus 8 (not represented in this figure).

FIG. 7 shows a detail of a seventh exemplary embodiment of a printer according to the invention, which has further a transport device 3 for transporting histology-laboratory consumable articles 16 coming from a material supply 1 (not represented in this figure).

The printer contains an optical reading device 13, which may for example be configured as a digital camera. The optical reading device 13 is connected via a data cable 14 to a control apparatus 8 (not represented in this figure). The optical reading device 13 forwards analog or digital image-pattern image signals of the image pattern 21 that has respectively been read via the data cable 14 to the control apparatus 8.

The transport device 3 comprises a conveyor belt 15 on which histology-laboratory consumable articles 16, namely slides 19, are transported. The optical reading device 13 reads an image pattern 21 of each histology-laboratory consumable article 16 passing it and forwards image signals relating to the image pattern 21 that has been read to the control apparatus 8 (not represented in this figure).

FIG. 8 schematically shows an eighth exemplary embodiment of a printer according to the invention.

The printer comprises a material supply 1, in which histology-laboratory consumable articles 16 to be printed on, for example cassettes 17 or slides 19, can be stored.

The printer furthermore comprises a transport apparatus 3, which respectively transports a histology-laboratory consumable article 16 in succession from the material supply 1 to a printing device 4. The transport apparatus 3 furthermore transports the histology-laboratory consumable articles 16 that have been printed on by the printing device 4 to a removal device 7, from which the histology-laboratory consumable articles 16 that have been printed on can then be removed.

The printer furthermore comprises an optical reading apparatus 13, which contains a first camera 22 and a second camera 23.

The first camera 22 reads an image pattern 21 of a histology-laboratory consumable article 16 to be printed on, generates analog or digital image-pattern image signals relating to the image pattern 21 that has been read and transfers the image-pattern image signals to a control apparatus 8 of the printer.

The control apparatus 8 evaluates the image-pattern image signals received from the first camera 22 and establishes at least one processing step for the further processing of the histology-laboratory consumable articles 16 as a function of the evaluation result. During the evaluation, the control apparatus 8 compares the image-pattern image signals received from the optical reading device 13 with the image signals of at least one reference image pattern.

If the control apparatus 8 has recognized the histology-laboratory consumable article 16 to be printed on and has established that a high-quality impression is possible, the control apparatus 8 outputs the message that everything is in order. At the same time, the control apparatus 8 establishes as a further processing step that an impression as intended should be carried out.

If the evaluation reveals that a sufficiently high-quality impression is not possible, or if the control apparatus 8 has not been able to assign a manufacturer and/or a product series to the detected image pattern 21 during the evaluation, a warning is output. In particular, in this case an impression may not be carried out until after confirmation by the laboratory staff that printing is still desired.

The second camera 23 respectively reads an impression 18 printed onto a histology-laboratory consumable article 16 by the printing device 4 while the histology-laboratory consumable article 16 is being transported away by the printing device 4. The second camera 23 generates analog or digital impression image signals relating to the impression 18 that has been read and transfers the impression image signals to the control apparatus 8.

The control apparatus 8 evaluates the impression image signals received from the optical reading apparatus 13. This is done by comparing the received impression image signals with the analog or digital image signals of the associated target impression image pattern. The printer receives the analog or digital image signals of the target impression image pattern, which can contain in particular patient data in clear text or in coded form, from a superordinate computer (not represented in this figure) to which the printer is connected by means of the interface 9.

If the evaluation reveals that the impression 18 applied onto the respective histology-laboratory consumable article 16 is error-free, the control apparatus 8 controls the transport device 3 in such a way that the histology-laboratory consumable article 16 is transported to the removal device 7.

If the evaluation reveals that the impression 18 applied onto the respective histology-laboratory consumable article 16 is not error-free, the histology-laboratory consumable article 16 is excluded. In this case, the control apparatus 8 controls the transport apparatus 3 in such a way that the histology-laboratory consumable article 16 is transported to a further removal device 20, from which the user can remove the histology-laboratory consumable article 16 that has been incorrectly printed on, in particular for subsequent disposal.

The control apparatus 8 comprises an interface 9 for connecting the printer to a computer network or for direct connection to a computer.

The control apparatus 8 is connected by means of data cables 14 to the optical reading apparatus 13, the material supply 1, the transport apparatus 3 and the printing device 4, in order to receive data and/or output control instructions.

LIST OF REFERENCES 1 material supply
2 stack magazine
3 transport apparatus
4 printing device
5 warm-air drying apparatus
6 flash device
7 removal device
8 control apparatus
9 interface
10 display
11 input apparatus
12 memory apparatus
13 optical reading apparatus
14 data cable
15 conveyor belt
16 histology-laboratory consumable article
17 cassette
18 impression
19 slide
20 further removal device
21 image pattern

What is claimed is:

1. A printer having a printing device (4) for printing on histology-laboratory consumable articles (16), comprising an optical reading apparatus (13) and a control apparatus (8), wherein the optical reading apparatus (13) reads an image pattern of a histology-laboratory consumable article (16) to be printed on by means of the printing device (4), generates analog or digital image-pattern image signals relating to the image pattern (18) that has been read, and transfers the image-pattern image signals to the control apparatus (8),
   wherein the control apparatus (8) establishes at least one printing parameter to be adjusted as a function of the image-pattern image signals of the image pattern (18) that has been read;
   wherein the printing parameter relates to an ink or a toner or a drying temperature or a drying duration or a font size to be used or a font type to be used.

2. The printer as claimed in claim 1, wherein the control apparatus (8) evaluates the received image-pattern image signals and as a function of the evaluation result establishes at least one processing step for the further processing of the histology-laboratory consumable article (16) inside the printer.

3. The printer as claimed in claim 2, wherein in order to evaluate the received image-pattern image signals, the control apparatus (8) compares the image signals received from the optical reading apparatus (13) with the image signals of at least one reference image pattern.

4. The printer as claimed in claim 3, wherein the control apparatus (8) compares the image-pattern image signals received from the optical reading apparatus (13) with the image signals of the reference image pattern by image analysis and/or pattern recognition.

5. The printer as claimed in claim 2, wherein the at least one processing step involves requesting an input by a user.

6. The printer as claimed in claim 5, wherein the control apparatus (8) evaluates the input, and as a function of the input, deletes an already established processing step and/or establishes at least one further processing step for the further processing of the histology-laboratory consumable article (16).

7. The printer as claimed in claim 5, wherein the control apparatus (8) stops the processing of a histology-laboratory consumable article (16), in relation to which the input is expected, until the input arrives, and instead begins or continues the processing of at least one other histology-laboratory consumable article (16).

8. The printer as claimed in claim 2, wherein the at least one processing step involves outputting a message to a user.

9. The printer as claimed in claim 2, wherein the at least one processing step involves printing on the histology-laboratory consumable article (16).

10. The printer as claimed in claim 1, wherein the control apparatus (8) determines where a printing field is located on the histology-laboratory consumable article (16) on the basis of the image-pattern image signals.

11. A printer having a printing device (4) for printing on histology-laboratory consumable articles (16), comprising an optical reading apparatus (13) which:
   a. reads an image pattern of a histology-laboratory consumable article (16) to be printed on by the printing device (4), generates analog or digital image-pattern image signals relating to the image pattern (21) that has been read, and transfers the image-pattern image signals to a control apparatus (8) of the printer, and/or
   b. reads an impression (18) printed on a histology-laboratory consumable article (16) by the printing device (4), generates analog or digital impression image signals relating to the impression (18) that has been read, and transfers the impression image signals to a control apparatus (8) of the printer, which determines at least one quality parameter relating to the impression (18);
   wherein the control apparatus (8) evaluates the received image-pattern image signals and/or impression image signals and as a function of the evaluation result establishes at least one processing step for the further processing of the histology-laboratory consumable article (16) or another histology-laboratory consumable article (16) inside the printer;
   wherein the at least one processing step involves repeating the printing of a target impression image pattern on another histology-laboratory consumable article (16), the target impression image pattern associated with the impression (18) that has been read;
   wherein the control apparatus (8) establishes at least one printing parameter for the repetition of the printing of the target impression image pattern on the other histology-laboratory consumable article (16) as a function of the image signals of the impression (18) that has been read and/or as a function of a quality parameter determined relating to the impression (18).

12. The printer as claimed in claim 11, wherein the at least one processing step involves discarding the histology-laboratory consumable article (16) without printing on it.

13. The printer as claimed in claim 11, wherein:
   a. the control apparatus (8) respectively saves the received image-pattern image signals in a memory apparatus (12), and/or
   b. one of the processing steps involves saving the image signals of the image pattern (21) that has been read and/or saving information determined by the control apparatus (8) about the histology-laboratory consumable article (16), and/or
   c. the control apparatus (8) respectively saves the received impression image signals in a memory apparatus (12) or in that the control apparatus (8) respectively saves the received impression image signals together with image signals of the associated target impression image pattern.

14. The printer as claimed in claim 11, wherein the optical reading apparatus (13) is configured and arranged to read an image pattern (21) configured as a barcode or as a QR code or as a logo or as text.

15. The printer as claimed in claim 11, wherein the printer comprises a transport apparatus (3) which transports the histology-laboratory consumable articles (16).

16. The printer as claimed in claim 15, wherein the printer comprises a compartment for a multiplicity of histology-laboratory consumable articles (16) to be printed on, from which the transport apparatus (3) individually takes the histology-laboratory consumable articles (16) to be printed on and transports them further to the printing device (4).

17. The printer as claimed in claim 16, wherein the transport apparatus (3) transports the histology-laboratory consumable articles (16) printed on by the printing device (4) further, in particular to a removal device (7).

18. The printer as claimed in claim 16, wherein:
   a. the optical reading apparatus (13) respectively reads the image pattern (21) during the transport of a histology-laboratory consumable article (16) to be printed on to the printing device (4), and/or
   b. the optical reading apparatus (13) reads the impression (18) respectively during the transport of the histology-laboratory consumable article (16) to be printed on.

19. The printer as claimed in claim 11, wherein:
a. the printing device (4) is configured to print the impression (18) configured as an image or as a barcode or as a QR code or as a logo or as text onto the histology-laboratory consumable article, and/or
b. the optical reading device (13) is configured and arranged to read the impression (18) configured as an image or as a barcode or as a QR code or as a logo or as text.

20. The printer as claimed in claim 11, wherein the control apparatus (8) continuously keeps a log.

21. The printer as claimed in claim 20, wherein the control apparatus (8) saves log data in a memory and/or outputs the log data via an interface and/or displays the log data on an output device.

22. The printer as claimed in claim 11, wherein the printer is configured as an inkjet printer or as a laser printer.

23. The printer as claimed in claim 11, wherein the printer is configured as a cassette printer and/or as a slide printer and/or as a label printer.

24. The printer as claimed in claim 11, wherein the histology-laboratory consumable article (16) is a cassette (17) or a slide (19) or a label.

25. A histology laboratory system which comprises a printer as claimed in claim 11 and a superordinate computer, which receives log data from the printer.

26. The histology laboratory system as claimed in claim 25, wherein:
a. the superordinate computer receives further log data of other printers and/or other laboratory equipment, or
b. the superordinate computer receives further log data of other printers and/or other laboratory equipment and respectively saves and/or further processes the log data and the further log data, which relate to a same sample, while being assigned to one another and together.

27. A printer having a printing device (4) for printing on histology-laboratory consumable articles (16), comprising an optical reading apparatus (13) and a control apparatus (8), wherein the optical reading apparatus (13) reads an impression (18) printed on a histology-laboratory consumable article (16) by the printing device (4), generates analog or digital impression image signals relating to the impression (18) that has been read, and transfers the impression image signals to the control apparatus (8) of the printer, wherein the control apparatus (8) determines at least one quality parameter relating to the impression (18) that has been read.

28. The printer as claimed in claim 27, wherein:
a. the quality parameter relates to the sharpness of the impression (18), and/or
b. the quality parameter relates to the contrast of the impression (18), and/or
c. the quality parameter relates to the printing resolution of the impression (18), and/or
d. the quality parameter relates to the accuracy of the color of the impression (18), and/or
e. the quality parameter relates to the constancy of the color of the impression (18), and/or
f. the quality parameter relates to the color gradient of the impression (18), and/or
g. the quality parameter relates to the location of the impression (18) on the histology-laboratory consumable article (16), and/or
h. the quality parameter relates to the presence of the impression (18) on the histology-laboratory consumable article (16).

* * * * *